(12) United States Patent
Molleo et al.

(10) Patent No.: US 10,370,151 B2
(45) Date of Patent: Aug. 6, 2019

(54) CONTAINERS COATED WITH COMPOSITIONS HAVING ENHANCED HEAT-AGING PROPERTIES

(71) Applicant: PPG Industries Ohio, Inc., Cleveland, OH (US)

(72) Inventors: Max Molleo, Loveland, OH (US);
Kareem Kaleem, Loveland, OH (US);
Carl Seneker, Milford, OH (US);
Youssef Moussa, Loveland, OH (US);
Edward Dean, Cincinnati, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 408 days.

(21) Appl. No.: 14/996,363

(22) Filed: Jan. 15, 2016

(65) Prior Publication Data

US 2017/0203878 A1    Jul. 20, 2017

(51) Int. Cl.

| | | |
|---|---|---|
| B65D 25/14 | (2006.01) | |
| C09D 167/02 | (2006.01) | |
| B05D 3/00 | (2006.01) | |
| B65D 1/16 | (2006.01) | |
| C08G 63/91 | (2006.01) | |
| C09D 167/00 | (2006.01) | |

(52) U.S. Cl.
CPC ............. *B65D 25/14* (2013.01); *B05D 3/007* (2013.01); *B65D 1/165* (2013.01); *C08G 63/914* (2013.01); *C09D 167/00* (2013.01); *C09D 167/02* (2013.01)

(58) Field of Classification Search
CPC ........ B05D 3/007; B65D 1/165; B65D 25/14; C09D 167/02; C09D 167/00; C08G 63/914
See application file for complete search history.

(56) References Cited

U.S. PATENT DOCUMENTS

2012/0301646 A1*  11/2012  List ................... C08G 59/1422
                                                            428/35.7

FOREIGN PATENT DOCUMENTS

| CH | 1426409 | 2/1976 |
| WO | 2004013240 A1 | 2/2004 |
| WO | 2012162301 A1 | 11/2012 |
| WO | 2014078618 A1 | 5/2014 |
| WO | 2014205043 A1 | 12/2014 |

\* cited by examiner

*Primary Examiner* — Yan Lan
(74) *Attorney, Agent, or Firm* — William J. Uhl

(57) ABSTRACT

Food or beverage containers coated with polyester coating compositions containing capped polyesters are disclosed.

32 Claims, No Drawings

CONTAINERS COATED WITH COMPOSITIONS HAVING ENHANCED HEAT-AGING PROPERTIES

FIELD OF THE INVENTION

The present invention relates to container coating compositions based on polyester resins.

BACKGROUND OF THE INVENTION

A wide variety of coatings have been used to coat the surfaces of food and beverage containers. For example, metal cans are sometimes coated using coil coating or sheet coating operations, that is, a coil or sheet of steel or aluminum, is coated with a suitable composition and cured. The coated substrate is then formed into the can body or can end. Alternatively, the coating composition may be applied, for example, by spraying and dipping, to the formed can and then cured. Coatings for food and beverage containers should preferably be capable of high speed application to the substrate and provide the necessary properties when cured to perform in a demanding end use environment. For example, the coating should be safe for food contact and have excellent adhesion to the substrate.

Many of the coating compositions for food and beverage containers are based on epoxy resins that are the polyglycidyl ethers of bisphenol A. Bisphenol A in container coatings either as bisphenol A itself (BPA) or derivatives thereof, such as diglycidyl ethers of bisphenol A (BADGE), epoxy novolak resins and polyols prepared with bisphenol A and bisphenol F are problematic. Although the balance of scientific evidence available to date indicates that small trace amounts of BPA or BADGE that might be released from existing coatings does not pose health risks to humans, these compounds are nevertheless perceived by some as being harmful to human health. Consequently, there is a strong desire to eliminate these compounds from coatings for food and beverage containers. Accordingly, what are desired are container coating compositions for food and beverage containers that do not contain extractable quantities of BPA, BADGE or other derivatives of BPA and yet have commercially acceptable properties.

Hydroxyl and carboxylic acid functional polyesters curable with aminoplast or phenolplast curing agents provide suitable container coating compositions. However, such compositions can exhibit poor heat-aging properties. Specifically, they suffer from poor humidity resistance when the cured coating is exposed to high humidity conditions at elevated temperatures. When coated substrates such as the interior of carbonated beverage cans or can ends are exposed to such conditions and tested with a carbonated aqueous solution of citric acid, phosphoric acid and salt, known as L-85 liquor, the polyester/aminoplasts perform poorly. Consequently, the beverage manufacturers, although desirous of replacing the epoxy resins based on bisphenol A with polyesters, will not accept this poor performance.

The present invention discovered the poor performance of the coating due to heat aging was catalyzed by acid functionality in the polyester and if acid capping agents were reacted with the polyester resin, the degradation of the coating performance could be retarded, thereby maintaining performance of the coating. This modification results in a cured coating with improved cured coating performance when tested in accordance with the L-85 testing protocol described in paragraphs "G" and "H" appearing on pages 15 and 16 of this application.

SUMMARY OF THE INVENTION

The present invention is directed to an article comprising:
(a) a substrate of a food or beverage container including a portion thereof;
(b) a crosslinked coating applied to at least a portion of the substrate; the cured coating being derived from a coating composition comprising:
  (i) a polyester resin that is prepared by reacting:
    (A) a polyester resin containing terminal carboxylic acid groups having an acid number of at least 5, with
    (B) an end capping agent that reacts with the carboxylic acid groups to reduce the acid number to below 2;
  (ii) a crosslinking agent.

The invention also provides for a method comprising:
(a) providing a coating composition comprising:
  (i) a polyester resin that is prepared by reacting:
    (A) a polyester resin containing terminal carboxylic acid groups having an acid number of at least 5 reacted with
    (B) an end capping agent that reacts with the carboxylic acid groups to reduce the acid number to below 2.5;
  (ii) a crosslinking agent;
(b) applying the coating composition to a substrate prior to or after forming the substrate into a food or beverage container or portion thereof;
(c) heating the coated substrate to a temperature and for a time sufficient to crosslink the coating composition.

DETAILED DESCRIPTION

As used herein, unless otherwise expressly specified, all numbers such as those expressing values, ranges, amounts or percentages may be read as if prefaced by the word "about", even if the term does not expressly appear. Moreover, it should be noted that plural terms and/or phrases encompass their singular equivalents and vice versa. For example, "a" polymer, "a" crosslinker, and any other component refers to one or more of these components.

When referring to any numerical range of values, such ranges are understood to include each and every number and/or fraction between the stated range minimum and maximum.

As employed herein, the term "polyol" or variations thereof refers broadly to a material having an average of two or more hydroxyl groups per molecule. The term "polycarboxylic acid" refers to the acids having an average of two or more carboxylic acid groups per molecule and functional derivatives thereof, including anhydride derivatives where they exist, and lower alkyl esters having 1-4 carbon atoms.

As used herein, the term "polymer" refers broadly to prepolymers, oligomers and both homopolymers and copolymers. The term "resin" is used interchangeably with "polymer".

The term "crosslinking agent" or "curing agent" refers to a material that is reactive with itself or with the polyester to improve the solvent resistance of the applied coating.

By "heat aging" is meant exposure of a cured coating on a substrate exposed to 80% relative humidity at 100° F. (38° C.) for a period of 12 weeks.

By the "L-85 protocol" is meant coating a flat aluminum panel (11.4×38.1 centimeters) and curing the coating at 235 to 245° C. (aminoplast crosslinker) for 8 to 12 seconds; aging the coated panel for 12 weeks at 80% relative humidity and 100° F. (38° C.), then make can ends and run 7-day L-85 Pack Test and report the average Enamel Raters of 6 cans. See Table 4.

As used herein, the molecular weights are determined by gel permeation chromatography using a polystyrene standard. Unless otherwise indicated, molecular weights are on a number average basis ($M_n$).

The polyester resins suitable in the practice of the invention can have number average molecular weights ($M_n$) of 3000 to 20,000, such as 5000 to 15,000 g/mole. Molecular weights less than 3000 result in coatings with poor heat-aging properties; whereas molecular weights greater than 20,000 are difficult to prepare in standard commercial size reactors. The polyester resins useful in the practice of the invention typically are hydroxyl functional, with the hydroxyl number being from 5 to 50 and typically less than 15 milligrams of KOH per grams of polyester resin solids.

Suitable polyester resins are typically prepared by condensation (esterification) according to known processes [see, for example, Zeno Wicks, Jr., Frank N. Jones and S. Peter Pappas, *Organic Coatings: Science and Technology*, Vol. 1, pp. 122-132 (John Wiley & Sons: New York, 1992)]. As typically prepared, the polyester has an acid number of at least 5, usually in the range of 10 to 20. Incorporating the acid capping agent in the polyester such as during the preparation process as described below reduces the acid number to below 2.5, such as below 2.0

The polyester resin can be prepared from:
  (i) 0 to 8 mole percent of an aliphatic dicarboxylic acid containing from 4 to 12 carbon atoms,
  (ii) 20 to 60 mole percent of an aromatic dicarboxylic acid,
  (iii) 30 to 60 mole percent of an aliphatic diol having 2 to 6 carbon atoms, and
  (iv) 0.2 to 4 mole percent of a polyol having 3 or more hydroxyl groups;
  the mole percentages being based on total moles of (i)-(iv).

Among the aliphatic dicarboxylic acids that can be used are adipic acid, sebacic acid and maleic acid.

Examples of aromatic dicarboxylic acids are isophthalic acid, terephthalic acid, naphthalene dicarboxylic acid and phthalic anhydride.

Examples of aliphatic diols are ethylene glycol, 1,4-butanediol, 2-methyl-1,3-propanediol and 2-butyl-2-ethyl-1,3-propanediol.

Examples of polyols having 3 or more hydroxyl groups are triols such as trimethylolpropane and trimethylolethane and tetrols such as pentaerythritol.

Optionally, the polyester resin may be prepared with up to 15 mole percent of a saturated aliphatic dicarboxylic acid containing from 4 to 12 carbon atoms, such as adipic acid and sebacic acid. Other optional reactants are up to 5 mole percent of a cycloaliphatic diol, such as cyclohexane dimethanol, and up to 15 mole percent of a linear diol, such as ethylene glycol and 1,4-butanediol.

The polyester resin typically is present in the coating composition in amounts of 60 to 90, such as 70 to 90 percent by weight based on weight of resin solids in the coating composition.

As mentioned above, the acid functionality as measured by the acid number is controlled by adding an acid capping agent to the polyester during the "cook" that is during the condensation process being conducted at elevated temperature. One of the advantages of the invention is the time of typical polyester resin cook can be significantly reduced. Esterification is typically considered complete when an acid number less than 25, such as 10 to 20 is achieved. However, such reactions can take a long time, such as 30 to 100 hours, which ties up production equipment. Using the acid capping agents in accordance with the present invention allows significantly reduced reaction times, on the order of 10 to 20 hours and yet achieving acceptable coating properties. The acid capping agent can be added to the cook at a temperature of 60 to 200° C. when the acid number reaches a value higher than what is believed to be acceptable, such as 10 to 25, and the reaction continued to a reduced acid number of below 2.

Alternatively, the polyester resin can be initially prepared by conventional techniques and subsequently heated to a temperature of 60 to 250° C. until the acid number is below 2.

Examples of suitable acid capping agents have a molecular weight of 500 or less such as monooxazolines and dioxazolines such as phenylene-bis-oxazoline (PBO); epoxide containing materials such as monoepoxides or diepoxides, carbodiim ides and diazomethane. Specific examples of monoepoxides are hydroxyl-functional monoepoxides such as glycidol, glycidyl ethers such as octyl glycidyl ether, decyl glycidyl ether, hexadecyl glycidyl ether and 2-biphenyl glycidyl ether; glycidyl esters such as the glycidyl ester of versatic acid and glycidyl methacrylate.

The coating compositions of the present invention contain a crosslinking agent that is reactive with itself and reactive with the hydroxyl functionality of the polyester. Examples of suitable crosslinking agents are aminoplast or triazine-formaldehyde resins, phenolplast or phenol-formaldehyde resins, and blocked polyisocyanates.

The phenol-formaldehyde resins are preferably of the resol type. Examples of suitable phenols are phenol itself, butyl phenol, xylenol and cresol. Cresol-formaldehyde resins, typically etherified with butanol, are often used. For the chemistry in preparation of phenolic resins, reference is made to "The Chemistry and Application of Phenolic Resins or Phenolplasts", Vol. V, Part I, edited by Dr. Oldring; John Wiley & Sons/Cita Technology Limited, London, 1997. Examples of commercially available phenolic resins are PHENODUR® PR285 and BR612 and those resins sold under the trademark BAKELITE®, typically BAKELITE 6581 LB.

Examples of aminoplast resins are those which are formed by reacting a triazine such as melamine or benzoguanamine with formaldehyde. Preferably, these condensates are etherified typically with methanol, ethanol, butanol including mixtures thereof. For the chemistry preparation and use of aminoplast resins, see "The Chemistry and Applications of Amino Crosslinking Agents or Aminoplast", Vol. V, Part II, page 21 ff, edited by Dr. Oldring; John Wiley & Sons/Cita Technology Limited, London, 1998. These resins are commercially available under the trademark MAPRENAL® such as MAPRENAL MF980 and under the trademark CYMEL® such as CYMEL 303 and CYMEL 1128, available from Allenex AB.

Examples of blocked polyisocyanates are monomeric and oligomeric polyisocyanates reacted with a blocking agent that unblocks at curing temperatures. Examples of suitable polyisocyanates are described in U.S. Pat. No. 6,730,361, column 3, line 62, to column 4, line 17. Examples of blocking agents for these isocyanates are described in the same patent in column 4, lines 24-31.

Typically, the crosslinking agent is present in amounts of 5 to 25, such as 10 to 20 percent by weight, the percentages by weight being based on the weight of total resin solids in the coating composition. Amounts less than 5 percent provide insufficient cure, whereas amounts greater than 25 percent provide coatings that are too brittle and that may volatilize in the curing oven causing unwanted condensate buildup.

Typically, the coating composition preferably will contain a diluent, such as an organic solvent or blends of organic solvents, to dissolve or disperse the resinous materials. The organic solvent is selected to have sufficient volatility to evaporate essentially entirely from the coating composition during the curing process such as during a coil cure in which the metal is heated to 205-255° C. peak metal temperature for about 5 to 30 seconds. Examples of suitable organic solvents are aliphatic hydrocarbons such as mineral spirits and high flash point VM&P naphtha; aromatic hydrocarbons such as benzene, toluene, xylene and solvent naphtha 100, 150, 200 and the like; alcohols, for example, ethanol, n-propanol, isopropanol, n-butanol and the like; ketones such as acetone, cyclohexanone, methylisobutyl ketone and the like; esters such as ethyl acetate, butyl acetate, and the like; glycols such as butyl glycol, glycol ethers such as methoxypropanol and ethylene glycol monomethyl ether and ethylene glycol monobutyl ether and the like. Mixtures of various organic solvents can also be used. When present, the diluents are used in the coating compositions in amounts of about 55 to 85 percent, such as 65 to 75 percent by weight based on total weight of the coating composition.

The coating composition can optionally contain adjuvant resinous materials. A desirable adjuvant resinous material is a phosphatized polyester.

The phosphatized polyester is typically included in the coating composition and improves the adhesion of the coating composition to the substrate. The phosphatized polyester can be prepared by reacting a precursor polyester resin with a phosphorus acid.

The precursor polyester resin typically has a hydroxyl number of 20 to 75 mg KOH per gram of polyester resin and an acid value of 15 to 30 mg KOH per gram of polyester resin; each measured on a non-volatile solids basis.

The polyester resins have number average molecular weights ($M_n$) of 2000 to 5000 g/mole.

Suitable polyester resins are typically prepared as described above, that is, by condensation (esterification) according to known processes. The polyester resin is usually derived from a mixture of at least one polyfunctional alcohol (polyol), generally a mixture of diols and triols esterified with a polyacid. The polyacid component comprises an alpha, beta-ethylenically unsaturated polycarboxylic acid or anhydride.

The polyester resins are typically prepared from a mixture of the alpha, beta-ethylenically unsaturated polycarboxylic acid, usually with an aromatic and/or aliphatic polycarboxylic acid, and a polyol component, typically a mixture of a diol and triol. The polyol and polycarboxylic acid are combined in desired proportions and chemically reacted using standard esterification (condensation) procedures to provide a polyester having both hydroxyl and carboxylic acid groups in the polyester resin. A triol is typically used to provide a branched, as opposed to linear, polyester.

Examples of suitable polycarboxylic acids or anhydrides include, but are not limited to, maleic anhydride, maleic acid, fumaric acid, itaconic acid, phthalic acid, phthalic anhydride, isophthalic acid, trimellitic anhydride, terephthalic acid, naphthalene dicarboxylic acid, adipic acid, azelaic acid, succinic acid, sebacic acid and various mixtures thereof.

When used, the aromatic and/or aliphatic polycarboxylic acid is used in amounts up to 70 percent by weight, typically 50 to 65 percent by weight based on total weight of the polycarboxylic acid or anhydride.

Examples of suitable diols, triols and polyols include, but are not limited to, ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, trimethylol propane, hexylene glycol, cyclohexane dimethanol, and polyethylene or polypropylene glycol.

As mentioned above, the polyol component is a mixture of a diol and a triol. The weight ratio of diol to triol typically ranges from 0.5 to 10 to 1.

The equivalent ratio of polyol component to polycarboxylic acid is from 0.85 to 1.25 to 1.0.

The phosphorus acid which is reacted with the polyester resin can be a phosphinic acid, a phosphonic acid or is preferably phosphoric acid. The phosphoric acid can be in the form of an aqueous solution, for example, an 85 percent by weight aqueous solution, or can be 100 percent phosphoric acid or super phosphoric acid. The acid is provided in amounts of about 0.2-0.5 equivalents of phosphoric acid per hydroxyl equivalent of the polyester resin, i.e., 0.2-0.45 P-OH groups per hydroxyl group.

The reaction of the phosphorus acid with the polyester resin is typically conducted in organic solvent. The organic solvent is typically an aromatic solvent, a ketone or an ester having a boiling point of about 65 to 250° C. Examples of suitable solvents include methyl ethyl ketone, methyl isobutyl ketone, butyl glycol acetate and methoxypropyl acetate. The organic solvent for the reaction is typically present in amounts of about 20 to 50 percent by weight based on total weight of phosphorus acid, polyester resin and organic solvent.

The reactants and the organic solvent are typically mixed at a temperature between 50° C. to 95° C. and once the reactants are contacted, the reaction mixture is maintained at a temperature preferably between 90° C. to 200° C. The reaction typically is allowed to proceed for a period of about 45 minutes to 6 hours.

The phosphatized polyester is used, typically in minor amounts, in a coating composition where it provides for improved adhesion of the resultant coating to the substrate. The phosphatized polyester is typically present in the coating composition in amounts of 0.1 to 20, such as 0.8 to 12, for example 3 to 12 percent by weight, based on weight of resin solids in the coating composition. Amounts less than 0.1 percent by weight result in inferior adhesion of the coating composition to the substrate, whereas amounts greater than 20 percent by weight adversely affect adhesion.

Surfactants and flow additives can optionally be added to the coating composition to aid in flow and wetting of the substrate. Examples of suitable surfactants include, but are not limited to, nonyl phenol polyether and salts. Examples of suitable flow additives are those sold under the trademark DYNOADD from Dynea Industrial Coatings. If used, the surfactant or flow additive is present in amounts of at least 0.01 percent and no greater than 10 percent based on weight of resin solids in the coating composition.

Other optional additives are waxes such as carnauba wax and polyethylene wax. If present, waxes constitute from 0.5 to 3.0 percent by weight of resin solids in the coating composition.

In certain embodiments, the compositions used in the practice of the invention, are substantially free, may be essentially free and may be completely free of bisphenol A and derivatives or residues thereof, including bisphenol A ("BPA") and bisphenol A diglycidyl ether ("BADGE"). Such compositions are sometimes referred to as "BPA non intent" because BPA, including derivatives or residues thereof are not intentionally added but may be present in trace amounts because of unavoidable contamination from the environment. The compositions can also be substantially free and may be essentially free and may be completely free of Bisphenol F and derivatives or residues thereof, including bisphenol F and bisphenol F diglycidyl ether ("BPFG"). The term "substantially free" as used in this context means the compositions contain less than 1000 parts per million (ppm), "essentially free" means less than 100 ppm and "completely free" means less than 20 parts per billion (ppb) of any of the above mentioned compounds, derivatives or residues thereof.

The coating compositions of the present invention can be applied to containers of all sorts and are particularly well adapted for use on food and beverage cans (e.g., two-piece cans, three-piece cans, etc.). Besides food and beverage containers, the coating compositions can be applied to containers for aerosol applications such as deodorant and hair spray.

Two-piece cans are manufactured by joining a can body (typically a drawn metal body) with a can end (typically a drawn metal end). The coatings of the present invention are suitable for use in food or beverage contact situations and may be used on the inside or outside of such cans. They are suitable for spray applied, liquid coatings, wash coatings, sheet coatings, over varnish coatings and side seam coatings.

Spray coating includes the introduction of the coating composition into the inside of a preformed packaging container. Typical preformed packaging containers suitable for spray coating include food cans, beer and beverage containers, and the like. The spray preferably utilizes a spray nozzle capable of uniformly coating the inside of the preformed packaging container. The sprayed preformed container is then subjected to heat to remove the residual solvents and harden the coating.

A coil coating is a coating on a continuous planar substrate such as a continuous length of metal (e.g., steel or aluminum) unwound from a coil. Once coated, the coated coil is subjected to a short thermal, ultraviolet, and/or electromagnetic curing cycle, for hardening (e.g., drying and curing) of the coating. The coated metal strip is then typically wound into a coil for shipping. Coated coils can then be unwound and fabricated into formed articles, such as two-piece drawn food or beverage cans, three-piece food or beverage cans, food or beverage can ends, drawn and ironed food or beverage cans, and the like.

A wash coating is a coating of the exterior of two-piece drawn and ironed ("D&I") cans with a thin layer of protectant coating. The exterior of these D&I cans are "wash-coated" by passing preformed two-piece D&I cans under a curtain of a coating composition. The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is removed through the use of an "air knife". Once the desired amount of coating is applied to the exterior of each can, each can is passed through a thermal, ultraviolet, and/or electromagnetic curing oven to harden (e.g., dry and cure) the coating. The residence time of the coated can within the confines of the curing oven is typically from 1 minute to 10 minutes. The curing or crosslinking temperature within this oven will typically range from 150° C. to 220° C.

A sheet coating is described as the coating of separate pieces of a planar substrate, usually steel or aluminum, which have been pre-cut into square or rectangular "sheets". Typical dimensions of these sheets are approximately one square meter. Once coated, each sheet is cured. Once hardened (e.g., dried and cured), the sheets of the coated substrate are collected and prepared for subsequent fabrication. Sheet coatings provide a coated metal substrate that can be successfully fabricated into formed articles, such as two-piece drawn food cans, three-piece food cans, food can ends, drawn and ironed cans, beverage can ends, and the like. Coil and sheet coatings are typically cured or crosslinked for about 5 to 30 seconds to reach a peak metal temperature of 200 to 260° C.

A side seam coating is described as the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of liquid coating, which protects the exposed "weld" from subsequent corrosion or other effects to the contained foodstuff. The liquid coatings that function in this role are termed "side seam stripes". Typical side seam stripes are spray applied and cured quickly via residual heat from the welding operation in addition to a small thermal, ultraviolet, and/or electromagnetic oven.

EXAMPLES

Test Methods

The following test methods were utilized in the Examples that follow.

A. Blush Resistance: Blush resistance measures the ability of a coating to resist attack by various testing solutions. When the coated film absorbs test solution, it generally becomes cloudy or looks white. Blush is measured visually using a scale of 1-10 where a rating of "10" indicates no blush and a rating of "0" indicates complete whitening of the film. Blush ratings of at least 7 are typically desired for commercially viable coatings, although some of the test solutions such as acetic acid and citric acid are run primarily to look at adhesion and the customer may not have a specification for blush.

B. Dowfax Detergent Test: The "Dowfax" test is designed to measure the resistance of a coating to a boiling detergent solution. The solution is prepared by mixing 5 grams of DOWFAX 2A1 (product of Dow Chemical) into 3000 grams of deionized water. Coated strips are immersed into the boiling Dowfax solution for 15 minutes. The strips are then rinsed and cooled in deionized water, dried, and immediately rated for blush as described previously.

C. Joy Detergent Test: The "Joy" test is designed to measure the resistance of a coating to a hot 180° F. (82° C.) Joy detergent solution. The solution is prepared by mixing 30 grams of Ultra Joy Dishwashing Liquid (product of Procter & Gamble) into 3000 grams of deionized water. Coated strips are then rinsed and cooled in deionized water, dried, and immediately rated for blush as described previously.

D. Acetic Acid Test: The "Acetic Acid" test is designed to measure the resistance of a coating to a boiling 3% acetic acid solution. The solution is prepared by mixing 90 grams of Glacial Acetic Acid (product of Fisher Scientific) into 3000 grams of deionized water. After boiling 30 minutes, the coated strips are then rinsed and cooled in deionized water, dried, and immediately rated for blush as described previously.

E. Deionized Water Retort Test: The "DI Water Retort" test is designed to measure the resistance of a coating to deionized water. Coated strips are immersed into the deionized water and placed in a steam retort for 30 minutes at 250° F. (121° C.). The strips are then cooled in deionized water, dried, and immediately rated to blush as described previously.

F. Sol Fraction Test and film test (mg/in$^2$): Sol Fraction is a test designed to measure the degree of cure of a coating. If the panel is coated on both sides, remove the coating from the side of the panel not being tested. Punch out a four square inch disk in the hole puncher. Weigh disk on a four place balance. This is the "initial weight". Place samples into racks and soak in MEK (Methyl Ethyl Ketone) for 10 minutes. Remove samples and place into 400° F. (204° C.) oven for 2 minutes, remove, cool, and weigh again. This value is the "post bake weight". Next, place the disk into Sulfuric Acid (A298-212 Technical Grade available from Fisher Scientific) for 3 minutes to strip the coating from the metal. Rinse the panel with water to remove coating completely, dry panel and re-weigh. This is the "final weight". The equation used to determine Sol Fraction is:

$$\frac{(\text{Initial weight} - \text{Post Bake weight})}{(\text{Initial weight} - \text{Final weight})} \times 100 = Sol \text{ Fraction}$$

The lower the number for Sol Fraction, the better the cure. Film weight in milligrams/square inch (mg/in$^2$) =Initial weight (mg)–final weight (mg). Since the disk is 4 square inches, divide this number by 4 to give the mg/in$^2$.

G. WACO Enamel Rater Test: The WACO Enamel Rater test determines the integrity of a coated can end by quantifying metal exposure. The coating evaluated had a dry film thickness of 6.5 to 7.5 mg/in$^2$ with 7 mg/in$^2$ being the largest thickness. The coated end is secured by vacuum to the electrolyte-filled and electrode-containing end fixture. The fixture and specimen are inverted so that electrode and the coating side of the end come into contact with the electrolyte solution and the edge of the sample contacts a metal chisel, completing the circuit. The instrument then applies a constant voltage (normally 6.3 VDC) across the coated surface and measures the resulting current at the industry standard of 4 seconds duration. The magnitude of the reading measured in milliamps (mA) with an operational range of 0 to 500 mA is directly proportional to the amount of exposed metal in the test sample. A low reading of less than 10 is desirable since that indicates there is very little exposed metal on the end. The ends produced for the experiment in this patent were CDL type ends made on a Minster Press (Minster Machine Company of Minster, Ohio) and CDL tooling designed by Container Development Limited of Dayton, Ohio.

H. Liquor 85 Test Pack (L-85): A test solution similar to the original L-85 was used except with 10 times the original salt level. A stock solution is shown below:

| | |
|---|---|
| Deionized Water | 917.3 grams |
| Citric Acid | 92.0 grams |
| 85% Phosphoric Acid | 33.3 grams |
| Morton Salt (Sodium Chloride with no iodine) | 71.0 grams |

To the 12 oz. beverage can, measure out 47 grams of the above stock solution of L-85 and then add 308 grams of Sparkling Water (Carbonated Water). Then use a CDL type seamer to seam the end onto the can. The packed cans are then placed upside down (inverted) into a 100° F. (38° C.) incubator for a period of time (usually 7 days). Then remove the cans from the incubator, open them, and then measure Enamel raters (metal exposure) using the Waco Enamel rater test mentioned above. An acceptable enamel rater after L-85 pack testing are mA readings that are less than 10 and preferably less than 5, and more preferably less than 2.

Illustrating the invention are the following examples that are not to be considered as limiting the invention to their details. All parts and percentages in the examples, as well as throughout the specification, are by weight (grams) unless otherwise indicated.

Example A

Polyester Polymer

| | Name | Amount |
|---|---|---|
| Charge #1 | 2-Methyl-1,3-Propanediol | 1088.21 |
| Charge #2 | Dibutyl Tin Oxide (catalyst) | 1.01 |
| Charge #3 | Terephthalic Acid | 1711.66 |
| Charge #4 | Ethylene Glycol | 765.65 |
| Charge #5 | Adipic Acid | 531.65 |
| Charge #6 | Isophthalic Acid | 1711.66 |
| Charge #7 | Trimethylol Propane | 65.28 |
| Charge #8 | Aromatic 150 (hydrocarbon solvent from Exxon Mobil) | 555.58 |
| Charge #9 | Aromatic 150 | 2043.26 |

1. Set reactor for packed column with head temperature and turn on condenser and nitrogen on sparge.
2. Add Charges #1, 2, 3, 4, and 5 to reactor. Heat reactor slowly to 160° C. (320° F.). Increase the temperature to maintain a maximum column head temperature of 96° C. (212° F.)—Maximum reactor temperature of 230° C. (446° F.). Maintain steady rate of distillation and process until material is clear and an acid value of 3 or below is achieved.
3. Cool reactor to 160° C. (320° F.).
4. Add Charges #6 and 7 to the reactor, and heat the reactor to 190° C. (374° F.). Increase the temperature to maintain a maximum column head temperature of 96° C. (212° F.)—Maximum reactor temperature of 230° C. (446° F.). Maintain steady rate of distillation and process until material is clear and an acid value of 40 or below is achieved.

5. Cool reactor to 180° C. (356° F.). Pump charge #8 into the reactor. Set up azeotropic distillation over packed column filling the decanter with Aromatic 150. Increase temperature to maintain a steady reflux—Maximum reactor temperature of 230° C. (446° F.).
6. Make in-process sample cuts in this ratio: 10 g sample (@ 96% TNV) from reactor with 14 g of N-methyl-2-pyrrolidone to solids of 40%.
7. Process material until the acid value is 15 or below and the Gardner tube viscosity is between W to Z.
8. Lower the reactor temperature to 160° C. (320° F.). Pump Charge #9 to the reactor.
9. The resulting solids concentration was 65.13% and the final acid number based on solids was 9.6.

Example B (Comparative)

Uncapped Polyester Polymer

| Name | | Amount |
|---|---|---|
| Charge #1 | Example A | 400 |
| Charge #2 | Methyl Ether Propylene Glycol | 81.68 |
| Charge #3 | Propylene Carbonate | 174.20 |

1. Pump Charge #1 to the reactor at 120° C. (248° F.).
2. Cool reactor to 120° C. (248° F.). Pump Charges #2 and 3 to the reactor. Cool to 60° C. (140° F.) and filter through a 5 micron filter bag.
3. The resulting number average molecular weight of this polyester was 8790, the weight average molecular weight was 36309, the final solids concentration was 39.80%, and the final acid number based on solids was 9.6.

Example C

Polyester Polymer

| Name | | Amount |
|---|---|---|
| Charge #1 | 2-Methyl-1,3-Propanediol | 1088.21 |
| Charge #2 | Dibutyl Tin Oxide (catalyst) | 1.01 |
| Charge #3 | Terephthalic Acid | 1711.66 |
| Charge #4 | Ethylene Glycol | 765.65 |
| Charge #5 | Adipic Acid | 531.65 |
| Charge #6 | Isophthalic Acid | 1711.66 |
| Charge #7 | Trimethylol Propane | 65.28 |
| Charge #8 | Aromatic 150 | 555.58 |
| Charge #9 | Aromatic 150 | 2043.26 |

1. Set reactor for packed column with head temperature and turn on condenser and nitrogen on sparge.
2. Add Charges #1, 2, 3, 4, and 5 to reactor. Heat reactor slowly to 160° C. (320° F.). Increase the temperature to maintain a maximum column head temperature of 96° C. (212° F.)—Maximum reactor temperature of 230° C. (446° F.). Maintain steady rate of distillation and process until material is clear and an acid value of 3 or below is achieved.
3. Cool reactor to 160° C. (320° F.).
4. Add Charges #6 and 7 to the reactor, and heat the reactor to 190° C. (374° F.). Increase the temperature to maintain a maximum column head temperature of 96° C. (212° F.)—Maximum reactor temperature of 230° C. (446° F.). Maintain steady rate of distillation and process until material is clear and an acid value of 40 or below is achieved.
5. Cool reactor to 180° C. (356° F.). Pump charge #8 into the reactor. Set up azeotropic distillation over packed column filling the decanter with Aromatic 150. Increase temperature to maintain a steady reflux—Maximum reactor temperature of 230° C. (446° F.).
6. Make in-process sample cuts in this ratio: 10 g sample (@ 96% TNV) from reactor with 14 g of N-methyl-2-pyrrolidone to solids of 40%.
7. Process material until the acid value is 15 or below and the Gardner tube viscosity is between W to Z.
8. Lower the reactor temperature to 160° C. (320° F.). Pump Charge #9 to the reactor.
9. The resulting solids concentration was 65.67% and the final acid number based on solids was 10.7.

Example D (Comparative)

Uncapped Polyester Polymer

| Name | | Amount |
|---|---|---|
| Charge #1 | Example C | 400 |
| Charge #2 | Methyl Ether Propylene Glycol | 82.36 |
| Charge #3 | Propylene Carbonate | 175.64 |

1. Pump Charge #1 to the reactor at 120° C. (248° F.).
2. Cool reactor to 120° C. (248° F.). Pump Charges #2 and 3 to the reactor. Cool to 60° C. (140° F.) and filter through a 5 micron filter bag.
3. The resulting number average molecular weight of this polyester was 9081, the weight average molecular weight was 42360, the final solids concentration was 39.19%, and the final acid number based on solids was 10.7.

Example E

Acid-Capped Polyester Polymer

| Name | | Amount |
|---|---|---|
| Charge #1 | Example A | 867.00 |
| Charge #2 | Glycidol | 14.40 |
| Charge #3 | Ethyltriphenylphosphonium Iodide | 0.25 |
| Charge #4 | Methyl Ether Propylene Glycol | 147.40 |
| Charge #5 | Propylene Carbonate | 305.20 |
| Charge #6 | Aromatic 150 | 159.60 |

1. Pump Charge #1 to the reactor at 140° C. (284° F.).
2. Add Charges #2 and 3 to the reactor. Hold reactor at 140° C. (284° F.) for four hours.
3. Cool reactor to 120° C. (248° F.). Pump Charges #4-6 to the reactor. Cool to 60° C. (140° F.) and filter through a 5 micron filter bag.
4. The resulting number average molecular weight of this polyester was 9087, the weight average molecular weight was 37816, the final solids concentration was 39.30%, and the final acid number based on solids was 1.02.

Example F

Acid-Capped Polyester Polymer

| | Name | Amount |
|---|---|---|
| Charge #1 | Example A | 601.90 |
| Charge #2 | Cardura E-10P (Glycidyl Ester of Versatic Acid 10) | 16.10 |
| Charge #3 | Ethyltriphenylphosphonium Iodide | 0.12 |
| Charge #4 | Methyl Ether Propylene Glycol | 101.67 |
| Charge #5 | Propylene Carbonate | 216.87 |

1. Pump Charge #1 to the reactor at 140° C. (284° F.).
2. Add Charges #2 and 3 to the reactor. Hold reactor at 140° C. (284° F.) for four hours.
3. Cool reactor to 120° C. (248° F.). Pump Charges #4 and 5 to the reactor. Cool to 60° C. (140° F.) and filter through a 5 micron filter bag.
4. The resulting number average molecular weight of this polyester was 9213, the weight average molecular weight was 39264, the final solids concentration was 40.60%, and the final acid number based on solids was 0.66.

Example G

Acid-Capped Polyester Polymer

| | Name | Amount |
|---|---|---|
| Charge #1 | Example A | 1168.2 |
| Charge #2 | 2,2'-[1,3-phenylene-bis-oxazoline] (PBO) | 28.17 |
| Charge #3 | Methyl Ether Propylene Glycol | 247.43 |
| Charge #4 | Propylene Carbonate | 527.82 |

1. Pump Charge #1 to the reactor at 140° C. (284° F.).
2. Add Charges #2 and 3 to the reactor. Hold reactor at 140° C. (284° F.) for four hours.
3. Cool reactor to 120° C. (248° F.). Pump Charges #4-6 to the reactor. Cool to 60° C. (140° F.) and filter through a 5 micron filter bag.
4. The resulting number average molecular weight of this polyester was 12203, the weight average molecular weight was 87645, the final solids concentration was 39.48%, and the final acid number based on solids was 0.21.

Example H

Acid-Capped Polyester Polymer

| | Name | Amount |
|---|---|---|
| Charge #1 | Example C | 363.5 |
| Charge #2 | Cardura E-10P (Glycidyl Ester of Versatic Acid 10) | 10.40 |
| Charge #3 | Tripropylamine | 0.07 |
| Charge #4 | Methyl Ether Propylene Glycol | 74.80 |
| Charge #5 | Propylene Carbonate | 159.60 |

1. Pump Charge #1 to the reactor at 140° C. (284° F.).
2. Add Charges #2 and 3 to the reactor. Hold reactor at 140° C. (284° F.) for four hours.
3. Cool reactor to 120° C. (248° F.). Pump Charges #4 and 5 to the reactor. Cool to 60° C. (140° F.) and filter through a 5 micron filter bag.
4. The resulting number average molecular weight of this polyester was 9015, the weight average molecular weight was 35135, the final solids concentration was 40.19%, and the final acid number based on solids was 2.21.

Example I

Acid-Capped Polyester Polymer

| | Name | Amount |
|---|---|---|
| Charge #1 | Example C | 330.00 |
| Charge #2 | Glycidyl Methacrylate | 5.90 |
| Charge #3 | Ethyltriphenylphosphonium Iodide | 0.10 |
| Charge #4 | Methyl Ether Propylene Glycol | 67.90 |
| Charge #5 | Propylene Carbonate | 144.90 |

1. Pump Charge #1 to the reactor at 150° C. (302° F.).
2. Add Charges #2 and 3 to the reactor. Hold reactor at 150° C. (302° F.) for four hours.
3. Cool reactor to 120° C. (248° F.). Pump Charges #4 and 5 to the reactor. Cool to 60° C. (140° F.) and filter through a 5 micron filter bag.
4. The resulting number average molecular weight of this polyester was 8396, the weight average molecular weight was 32776, the final solids concentration was 40.60%, and the final acid number based on solids was 0.23.

Example J

Acid-Capped Polyester Polymer

| | Name | Amount |
|---|---|---|
| Charge #1 | Example C | 331.20 |
| Charge #2 | 2-Biphenylyl Glycidyl Ether | 9.40 |
| Charge #3 | Ethyltriphenylphosphonium Iodide | 0.07 |
| Charge #4 | Methyl Ether Propylene Glycol | 65.90 |
| Charge #5 | Propylene Carbonate | 140.50 |

1. Pump Charge #1 to the reactor at 180° C. (356° F.).
2. Add Charges #2 and 3 to the reactor. Hold reactor at 180° C. (356° F.) for four hours.
3. Cool reactor to 120° C. (248° F.). Pump Charges #4 and 5 to the reactor. Cool to 60° C. (140° F.) and filter through a 5 micron filter bag.
4. The resulting number average molecular weight of this polyester was 8229, the weight average molecular weight was 35045, the final solids concentration was 40.53%, and the final acid number based on solids was 0.47.

Example K

Acid-Capped Polyester Polymer

| | Name | Amount |
|---|---|---|
| Charge #1 | Example C | 298.90 |
| Charge #2 | Octyl/Decyl Glycidyl Ether | 9.40 |
| Charge #3 | Ethyltriphenylphosphonium Iodide | 0.07 |
| Charge #4 | Methyl Ether Propylene Glycol | 58.70 |
| Charge #5 | Propylene Carbonate | 125.10 |

1. Pump Charge #1 to the reactor at 180° C. (356° F.).
2. Add Charges #2 and 3 to the reactor. Hold reactor at 180° C. (356° F.) for four hours.
3. Cool reactor to 120° C. (248° F.). Pump Charges #4 and 5 to the reactor. Cool to 60° C. (140° F.) and filter through a 5 micron filter bag.
4. The resulting number average molecular weight of this polyester was 9262, the weight average molecular weight was 37802, the final solids concentration was 40.17%, and the final acid number based on solids was 0.62.

Example L

Acid-Capped Polyester Polymer

| | Name | Amount |
|---|---|---|
| Charge #1 | Example C | 350.70 |
| Charge #2 | Glycidyl Hexadecyl Ether | 13.12 |
| Charge #3 | Ethyltriphenylphosphonium Iodide | 0.10 |
| Charge #4 | Methyl Ether Propylene Glycol | 69.00 |
| Charge #5 | Propylene Carbonate | 147.10 |

1. Pump Charge #1 to the reactor at 180° C. (356° F.).
2. Add Charges #2 and 3 to the reactor. Hold the reactor at 180° C. (356° F.) for four hours.
3. Cool reactor to 120° C. (248° F.). Pump Charges #4 and 5 to the reactor. Cool to 60° C. (140° F.) and filter through a 5 micron filter bag.
4. The resulting number average molecular weight of this polyester was 9444, the weight average molecular weight was 39017, the final solids concentration was 39.99%, and the final acid number based on solids was 0.85.

Example M

Glycidyl Methacrylate Containing Acrylic Polymer (3% Glycidyl Methacrylate Based on Total Polymerizable Monomer Weight)

| | Name | Amount |
|---|---|---|
| Charge #1 | n-butyl alcohol | 262.76 |
| Charge #2 | Ethylene Glycol Monobutyl Ether | 862.27 |
| Charge #3 | Styrene | 415.65 |
| Charge #4 | Ethyl Acrylate | 223.56 |
| Charge #5 | Glycidyl Methacrylate | 22.67 |
| Charge #6 | Methacrylic Acid | 1.92 |
| Charge #7 | Methyl Methacrylate | 91.98 |
| Charge #8 | t-Butyl Peroxy-2-Ethyl Hexanoate | 37.39 |

-continued

| | Name | Amount |
|---|---|---|
| Charge #9 | Ethylene Glycol Monobutyl Ether | 15.37 |
| Charge #10 | t-Butyl Peroxy-2-Ethyl Hexanoate | 16.12 |
| Charge #11 | Ethylene Glycol Monobutyl Ether | 37.54 |
| Charge #12 | Ethylene Glycol Monobutyl Ether | 9.65 |
| Charge #13 | t-Butyl Peroxy-2-Ethyl Hexanoate | 1.55 |
| Charge #14 | t-Butyl Peroxy-2-Ethyl Hexanoate | 1.55 |

1. Add Charges #1 and 2 to the reactor, heat the reactor to 100° C. (212° F.).
2. Pump Charges #3, 4, 5, 6, 7, and 8 to the reactor over 150 minutes while maintaining a reactor temperature of 98-100° C. (208-212° F.).
3. Add Charge #9 as a pump/line rinse.
4. Pump Charges #10 and 11 to the reactor over 60 minutes while maintaining a reactor temperature of 98-100° C. (208-212° F.).
5. Add Charge #12 as a pump/line rinse and hold for 60 minutes at 98-100° C. (208-212° F.).
6. Add Charge #13 and hold for 60 minutes at 98-100° C. (208-212° F.).
7. Add Charge #14 and hold for 60 minutes at 98-100° C. (208-212° F.).
8. Cool reactor to 60° C. (140° F.) and filter through a 5 micron filter bag.
9. The resulting number average molecular weight of this polyester was 4463, the weight average molecular weight was 9722, and the final solids concentration was 41.95%.

Example N

Glycidyl Methacrylate Containing Acrylic Polymer (10% Glycidyl Methacrylate Based on Total Polymerizable Monomer Weight)

| | Name | Amount |
|---|---|---|
| Charge #1 | n-butyl alcohol | 262.76 |
| Charge #2 | Ethylene Glycol Monobutyl Ether | 862.27 |
| Charge #3 | Styrene | 362.73 |
| Charge #4 | Ethyl Acrylate | 223.56 |
| Charge #5 | Glycidyl Methacrylate | 75.59 |
| Charge #6 | Methacrylic Acid | 1.92 |
| Charge #7 | Methyl Methacrylate | 91.98 |
| Charge #8 | t-Butyl Peroxy-2-Ethyl Hexanoate | 37.39 |
| Charge #9 | Ethylene Glycol Monobutyl Ether | 15.37 |
| Charge #10 | t-Butyl Peroxy-2-Ethyl Hexanoate | 16.12 |
| Charge #11 | Ethylene Glycol Monobutyl Ether | 37.54 |
| Charge #12 | Ethylene Glycol Monobutyl Ether | 9.65 |
| Charge #13 | t-Butyl Peroxy-2-Ethyl Hexanoate | 1.55 |
| Charge #14 | t-Butyl Peroxy-2-Ethyl Hexanoate | 1.55 |

1. Add Charges #1 and 2 to the reactor, heat the reactor to 100° C. (212° F.).
2. Pump Charges #3, 4, 5, 6, 7, and 8 to the reactor over 150 minutes while maintaining a reactor temperature of 98-100° C. (208-212° F.).
3. Add Charge #9 as a pump/line rinse.
4. Pump Charges #10 and 11 to the reactor over 60 minutes while maintaining a reactor temperature of 98-100° C. (208-212° F.).
5. Add Charge #12 as a pump/line rinse and hold for 60 minutes at 98-100° C. (208-212° F.).
6. Add Charge #13 and hold for 60 minutes at 98-100° C. (208-212° F.).

7. Add Charge #14 and hold for 60 minutes at 98-100° C. (208-212° F.).
8. Cool reactor to 60° C. (140° F.) and filter through a 5 micron filter bag.
9. The resulting number average molecular weight of this polyester was 4685, the weight average molecular weight was 10502, and the final solids concentration was 40.00%.

Example O

Acid-Capped Polyester Polymer

| Name | | Amount |
|---|---|---|
| Charge #1 | Example A | 748.6 |
| Charge #2 | Example M | 64.12 |
| Charge #3 | Dimethylethanolamine | 0.92 |
| Charge #4 | Methyl Ether Propylene Glycol | 134.33 |
| Charge #5 | Propylene Carbonate | 286.47 |
| Charge #6 | Aromatic 150 | 48.90 |

1. Pump Charge #1 to the reactor at 90° C. (194° F.).
2. Add Charges #2 and 3 to the reactor. Hold the reactor at 90° C. (194° F.) for four hours.
3. Cool reactor to 120° C. (248° F.). Pump Charges #4, 5, and 6 to the reactor. Cool to 60° C. (140° F.) and filter through a 5 micron filter bag.
4. The resulting number average molecular weight of this polyester-graft acrylic was 6514, the weight average molecular weight was 29,949, the final solids concentration was 39.13%, and the final acid number based on solids was 9.23.

Example P

Acid-Capped Polyester Polymer

| Name | | Amount |
|---|---|---|
| Charge #1 | Example A | 720.80 |
| Charge #2 | Example N | 61.74 |
| Charge #3 | Dimethylethanolamine | 0.89 |
| Charge #4 | Methyl Ether Propylene Glycol | 129.34 |
| Charge #5 | Propylene Carbonate | 275.83 |
| Charge #6 | Aromatic 150 | 47.13 |

1. Pump Charge #1 to the reactor at 90° C. (194° F.).
2. Add Charges #2 and 3 to the reactor. Hold the reactor at 90° C. (194° F.) for four hours.
3. Cool reactor to 120° C. (248° F.). Pump Charges #4, 5, and 6 to the reactor. Cool to 60° C. (140° F.) and filter through a 5 micron filter bag.
4. The resulting number average molecular weight of this polyester-graft acrylic was 6570, the weight average molecular weight was 29,420, the final solids concentration was 39.41%, and the final acid number based on solids was 8.58.

Example Q

A phosphatized polyester was prepared from 2-methyl-1,3-propane diol, trimethylolpropane, isophthalic acid, maleic anhydride, phthalic anhydride and phosphoric acid in accordance with U.S. 2012/0301647.

| Ingredient | Parts by Weight |
|---|---|
| 2-Methyl 1,3-Propane diol | 19.90 |
| Trimethylolpropane | 3.01 |
| Isophthalic acid | 14.35 |
| Phosphoric acid (85%) | 0.22 |
| Maleic anhydride | 8.35 |
| Phthalic anhydride | 7.30 |
| Aromatic 100 | 7.79 |
| Phosphoric acid (85%) | 0.89 |
| Water | 0.08 |
| 2-Butoxyethanol | 4.26 |
| Monobutyl ether of diethylene glycol | 33.80 |

The first two ingredients were charged in a reaction vessel equipped with an agitator, a nitrogen blanket and a distillation set up and heated to 50° C. Once the temperature is reached then the next four ingredients were added to the vessel and slowly heated to distillation. The mixture was esterified under a nitrogen atmosphere over a period of about twelve (12) hours at a temperature ranging between 180° C. and 240° C.

When the acid value of the mixture dropped to about 13.00 mg of KOH/g, the mixture was cooled to about 160° C. and then the AROMATIC 100 solvent (i.e., an aromatic hydrocarbon solvent blend commercially available from Exxon Mobil) was incorporated for azeotropic distillation of water evolved as a condensate by-product. Thereafter, the phosphoric acid solution and water were added and the azeotropic distillation of water was continued until the acid value of the mixture dropped to below 20 mg of KOH/g. The resulting phosphatized polyester resin was then dissolved in the 2-butoxyethanol and monobutyl ether of diethylene glycol to produce a composition which was about 50 percent by weight solids.

The number average molecular weight of the resulting phosphatized polyester was about 4,500, the acid value was about 20 based on resin solids. Resin solids was about 50%.

Example R

Wax Dispersion

| Name | | Amount |
|---|---|---|
| Charge #1 | Polyester Resin | 47.63 |
| Charge #2 | Methyl Ether Propylene Glycol Acetate | 20.01 |
| Charge #3 | Polyethylene Wax Powder | 20.01 |
| Charge #4 | Aromatic 100 (aromatic hydrocarbon from Exxon Mobil) | 12.38 |

1. Add Charges #1, 2, and 3 into blender while mixing at high speed. Mix on high speed for 20 minutes—Maximum blend temperature of 38° C. (100° F.).
2. Add Charge #4, mix on low speed for 5 minutes.
3. The resulting final solids concentration is 40.01%

Formulations

Coatings compositions 1-7 were prepared by mixing together the ingredients shown in Table 1 below. Amounts are in parts by weight. Final theoretical weight solids of each of the examples is 31.33%.

TABLE 1

| Ingredients | Example 1 | Example 2 | Example 3 | Example 4 | Example 5 | Example 6 |
|---|---|---|---|---|---|---|
| (Polyester Resin) Example B | 92.94 | | | | | |
| (Polyester Resin) Example E | | 94.12 | | | | |
| (Polyester Resin) Example F | | | 91.11 | | | |
| (Polyester Resin) Example G | | | | 93.69 | | |
| (Polyester Resin) Example O | | | | | 94.53 | |
| (Polyester Resin) Example P | | | | | | 93.86 |
| Carnauba Wax/Solvent Mixture[1] | 2.13 | 2.13 | 2.13 | 2.13 | 2.13 | 2.13 |
| 2-Butoxyethyl Acetate | 10.43 | 10.43 | 10.43 | 10.43 | 10.43 | 10.43 |
| Aminoplast[2] | 10.98 | 10.98 | 10.98 | 10.98 | 10.98 | 10.98 |
| (Wax Dispersion) Example R | 0.44 | 0.44 | 0.44 | 0.44 | 0.44 | 0.44 |
| Aromatic 100 | 4.53 | 4.53 | 4.53 | 4.53 | 4.53 | 4.53 |
| (Phos. Polyester) Example Q | 3.76 | 3.76 | 3.76 | 3.76 | 3.76 | 3.76 |
| Leveling Agent | 0.09 | 0.09 | 0.09 | 0.09 | 0.09 | 0.09 |
| Aromatic 150 | 24.69 | 23.51 | 26.52 | 23.94 | 23.10 | 23.77 |

[1] 18/82 by weight mixture in 2-butoxyethanol.
[2] Benzoguanamine-formaldehyde resin.

Coatings compositions 8-14 were prepared by mixing together the ingredients shown in Table 2 below. Amounts are in parts by weight. Final theoretical weight solids of each of the examples is 31.32%.

TABLE 2

| Ingredients | Example 7 | Example 8 | Example 9 | Example 10 | Example 11 | Example 12 |
|---|---|---|---|---|---|---|
| (Polyester Resin) Example D | 94.39 | | | | | |
| (Polyester Resin) Example H | | 92.04 | | | | |
| (Polyester Resin) Example I | | | 91.56 | | | |
| (Polyester Resin) Example J | | | | 91.27 | | |
| (Polyester Resin) Example K | | | | | 92.08 | |
| (Polyester Resin) Example L | | | | | | 92.50 |
| Carnauba Wax/Solvent Mixture | 2.13 | 2.13 | 2.13 | 2.13 | 2.13 | 2.13 |
| 2-Butoxyethyl Acetate | 10.43 | 10.43 | 10.43 | 10.43 | 10.43 | 10.43 |
| Aminoplast | 10.98 | 10.98 | 10.98 | 10.98 | 10.98 | 10.98 |
| (Wax Dispersion) Example R | 0.44 | 0.44 | 0.44 | 0.44 | 0.44 | 0.44 |
| (Phos. Polyester) Example Q | 3.76 | 3.76 | 3.76 | 3.76 | 3.76 | 3.76 |
| Leveling Agent | 0.09 | 0.09 | 0.09 | 0.09 | 0.09 | 0.09 |
| Aromatic 150 | 27.78 | 30.54 | 30.13 | 30.60 | 27.24 | 29.67 |

Coating Application

Examples 1-6 were drawn down with a #22 wire wound bar over Zr treated aluminum flat panels to give 6.5-7.5 mg/in² (milligrams/square inch), the targeted film thickness for interior beverage end coatings. The oven temperature was 338° C. (640° F.), dwell time 10 seconds to give a peak metal temperature of 241° C. (465° F.).

Examples 7-12 were drawn down with a #24 wire wound bar over Zr treated aluminum flat panels to give 6.5-7.5 mg/in². The oven temperature was 338° C. (640° F.), dwell time 10 seconds to give a peak metal temperature of 241° C. (465° F.).

The panels with the cured coating were then evaluated by the test methods described above and the results reported in Table 3.

The data tabulated in Table 3 indicates that the polyesters that were acid-capped with the GMA acrylics performed poorly on the Joyand deionized water retort blush tests. The polyesters that were acid-capped with small-molecule epoxides or oxazolines performed similarly on the blush tests as compared with the non-acid-capped control polyesters.

TABLE 3

| Example | Acid Capper Used | Coating Weight (mg/in²) | Sol Fraction | Joy Detergent Test (Blush) | Dowfax Detergent Test (Blush) | Acetic Acid Test (Blush) | Deionized Water Retort Test (Blush) |
|---|---|---|---|---|---|---|---|
| 1 | None-Control | 6.8 | 4.06 | 7.5 | 6 | 1.5 | 5 |
| 2 | Glycidol | 6.7 | 4.09 | 8 | 7.5 | 2.5 | 7.5 |
| 3 | Cardura E-10P | 6.9 | 5.80 | 7 | 5 | 2 | 7 |
| 4 | PBO | 6.7 | 6.34 | 7 | 5 | 1 | 8 |
| 5 | 3% GMA | 6.7 | 9.33 | 3 | 4 | 1 | 2.5 |
| 6 | 10% GMA | 6.7 | 8.18 | 4 | 5.5 | 1 | 4 |
| 7 | None-Control | 7.4 | 11.2 | 7 | 6.25 | 2 | 6.75 |
| 8 | Cardura E-10P | 7.6 | 11.6 | 6.75 | 6.5 | 2 | 7.75 |
| 9 | Glycidyl Methacrylate | 7.4 | 11.1 | 7 | 6.5 | 3 | 6.5 |
| 10 | 2-Biphenylyl Glycidyl Ether | 7.5 | 10.3 | 6.5 | 6.75 | 2 | 7.25 |
| 11 | Octyl/Decyl Glycidyl Ether | 7.5 | 14.3 | 7 | 6.5 | 2 | 7 |
| 12 | Glycidyl Hexadecyl Ether | 7.5 | 15.7 | 6.5 | 6.5 | 2 | 7.25 |

As shown by the test data in Table 4, the resins that used small-molecule epoxides or oxazolines to cap the carboxylic acid functionalities of the principal polyester exhibited much lower enamel rater current (and therefore, a much higher coating performance). These acid-capped polyesters exhibited high performance under both heat-aged and non-heat-aged conditions. However, the performance for the heat-aged cured coating was particularly good especially for the monoepoxides. The GMA acrylic-capped polyesters demonstrated poor performance.

TABLE 4

| Example | Acid Capper Used | Initial Enamel Raters before 7 Day L-85 Pack Test (Average of 6 cans, mA) | Enamel Raters after 7 Day L-85 Pack Test (Average of 6 cans, mA) | Flat Panel aged 12 wks at 100° F. (38° C.) and 80% humidity, then make ends and read initial Enamel Raters (Average of 6 cans, mA) | Flat Panel aged 12 wks at 100° F. (38° C.) and 80% humidity, then make ends and run 7 Day L-85 Pack Test (Average Enamel Raters of 6 cans, mA) | Flat Panel aged 12 wks at 100° F. (38° C.) and 80% humidity, then make ends and run 7 Day L-85 Pack Test. Then run aluminum pickup of the combined liquid solution of the 6 cans. (ppm) |
|---|---|---|---|---|---|---|
| 1 | None-Control | 11.22 | 64.18 | 276.33 | 500 | 4.23 |
| 2 | Glycidol | 0.45 | 4.05 | 0.58 | 4.28 | 1.28 |
| 3 | Cardura E-10P | 0.37 | 3.95 | 0.20 | 2.17 | 0.69 |
| 4 | PBO | 0.60 | 13.98 | 0.05 | 9.92 | 1.28 |
| 5 | 3% GMA | 346.83 | 500 | 395.00 | 500 | N/A |
| 6 | 10% GMA | 354.67 | 500 | 413.33 | 500 | N/A |
| 7 | None-Control | 0.90 | 24.78 | 428.83 | 500 | N/A |
| 8 | Cardura E-10P | 0.00 | 0.68 | 2.27 | 27.05 | 2.35 |
| 9 | Glycidyl Methacrylate | 0.00 | 0.73 | 1.67 | 25.02 | 1.75 |
| 10 | 2-Biphenyly1 Glycidyl Ether | 0.00 | 31.52 | 3.50 | 33.93 | 3.24 |
| 11 | Octyl/Decyl Glycidyl Ether | 0.00 | 0.62 | 0.90 | 3.90 | 0.64 |
| 12 | Glycidyl Hexadecyl Ether | 0.00 | 1.25 | 0.00 | 1.18 | 0.53 |

Whereas particular embodiments of this invention have been described above for purposes of illustration, it will be evident to those skilled in the art that numerous variations of the details of the present invention may be made without departing from the invention as defined in the appended claims.

Although various embodiments of the invention have been described in terms of "comprising", embodiments consisting essentially of or consisting of are also within the scope of the present invention.

The invention claimed is:
1. An article comprising:
(a) a substrate of a food or beverage container including a portion thereof,
(b) a crosslinked coating applied to at least a portion of the substrate; the cured coating being derived from a coating composition comprising:
(i) a polyester resin that is prepared by reacting:
(A) a polyester resin containing terminal carboxylic acid groups having an acid number of at least 5, with
(B) an end capping agent that reacts with the carboxylic acid groups to reduce the acid number to below 2.5, wherein the end capping agent comprises an oxazoline or an epoxide;
(ii) a crosslinking agent that is reactive with the polyester resin.
2. The article of claim 1 in which the substrate is a metal substrate.
3. The article of claim 1 in which the cured coating is applied to the interior surface of a substrate.
4. The article of claim 1 in which the polyester resin has an $M_n$ of from 3000 to 20,000.
5. The article of claim 4 in which the end capping agent is a monoepoxide.
6. The article of claim 5 in which the monoepoxide comprises a hydroxyl-functional epoxide, a glycidyl ether or a glycidyl ester.
7. The article of claim 6 in which the monoepoxide comprises glycidol, octyl glycidyl ether, decyl glycidyl ether, hexadecyl glycidyl ether, 2-biphenyl glycidyl ether, the glycidyl ester of versatic acid or glycidyl methacrylate.
8. The article of claim 1 in which the polyester resin has a hydroxyl number of from 5 to 50.
9. The article of claim 1 in which the crosslinking agent comprises an aminoplast, a phenolplast, and/or a blocked isocyanate.
10. The article of claim 1 in which the crosslinked coating has a thickness of 1 to 10 mg/in$^r$.
11. The article of claim 1 in which the coating composition is substantially free of bisphenol A and reaction products thereof.
12. The article of claim 1 in which the coating composition contains 0.1 to 20 percent by weight based on weight of resin solids of a phosphated polyester.
13. The article of claim 1 in which the crosslinked coating composition has a WACO Enamel Rater value less than 10 when tested according to the L-85 protocol.
14. The article of claim 1 which is a beverage can and/or a can end.
15. The article of claim 1 in which the coating composition is applied to the interior walls of the container or the interior surface of a can end.

16. The article of claim 1 in which the substrate is a length of coil metal to which the coating composition is applied and crosslinked at a temperature of 200 to 260° C. peak metal temperature for about 5 to 30 seconds.

17. A method comprising:
(a) applying the coating composition of claim 1 to a substrate prior to or after forming the substrate into a food or beverage container or portion thereof; and
heating the coated substrate to a temperature and for a time sufficient to crosslink the coating composition.

18. The method of claim 17 in which the coating composition is applied to the interior portion of a food or beverage container or a portion thereof.

19. The method of claim 17 comprising applying the coating composition to a planar substrate; heating the coated substrate to a time and temperature sufficient to crosslink the coating composition; and forming the substrate into a food or beverage container or a portion thereof with the crosslinked coating being on the interior surface of the food or beverage container or portion thereof.

20. The method of claim 17 in which the coated substrate is heated to a temperature of from 200 to 260° C. for 5 to 30 seconds.

21. The method of claim 17 in which the crosslinked coating has a thickness of 1 to 10 mg/in$^r$.

22. The method of claim 17 in which the substrate is a metal substrate.

23. The method of claim 17 in which the polyester resin has an $M_n$ of from 3000 to 20,000.

24. The method of claim 17 in which the end capping agent is a monoepoxide.

25. The method of claim 24 in which the monoepoxide comprises a hydroxyl-functional epoxy, a glycidyl ether or a glycidyl ester.

26. The method of claim 25 in which the monoepoxide comprises glycidol, octyl glycidyl ether, decyl glycidyl ether, hexadecyl glycidyl ether, 2-biphenyl glycidyl ether, the glycidyl ester of versatic acid or glycidyl methacrylate.

27. The method of claim 17 in which the polyester resin containing terminal carboxylic acid groups is reacted with the end capping agent at a temperature of from 60 to 150° C.

28. The method of claim 17 in which the polyester resin has a hydroxyl number of from 5 to 50.

29. The method of claim 17 in which the crosslinking agent comprises an aminoplast, a phenolplast, and/or a blocked isocyanate.

30. The method of claim 17 in which the coating composition contains 0.1 to 20 percent by weight based on weight of resin solids of a phosphated polyester.

31. The method of claim 17 in which the crosslinked coating composition has a WACO Enamel Rater value less than 5 when tested according to the L-85 protocol.

32. The method of claim 19 in which the planar substrate is a length of coil metal to which the coating composition is applied and crosslinked at a temperature of 200 to 260° C. peak metal temperature for about 5 to 30 seconds.

* * * * *